H. M. HULL.
KETTLE.
APPLICATION FILED OCT. 15, 1920.
1,389,305.
Patented Aug. 30, 1921.
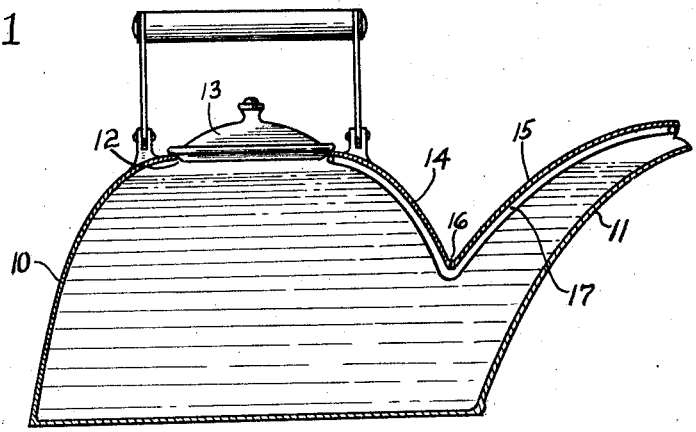
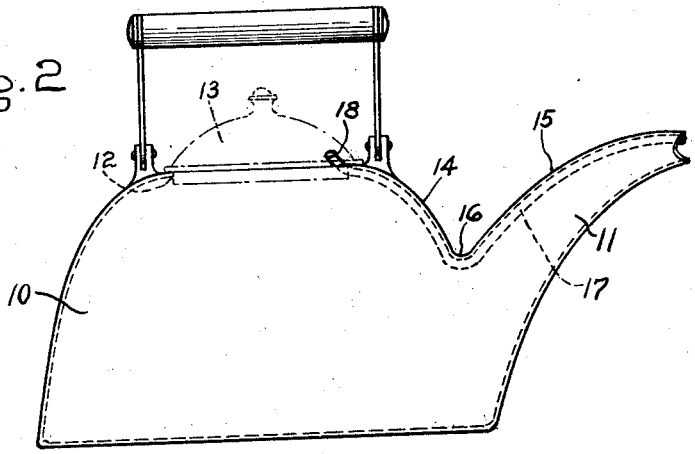
INVENTOR
HENRY M. HULL
BY
G. H. Braddock
ATTORNEY

UNITED STATES PATENT OFFICE.

HENRY M. HULL, OF FAIRFIELD, CONNECTICUT.

KETTLE.

1,389,305.   Specification of Letters Patent.   Patented Aug. 30, 1921.

Application filed October 15, 1920. Serial No. 417,189.

*To all whom it may concern:*

Be it known that HENRY M. HULL, a citizen of the United States, and resident of Fairfield, in the county of Fairfield and State of Connecticut, has invented certain new and useful Improvements in Kettles, of which the following is a specification.

The object of the present invention is to produce a novel kettle which will be in appearance similar to ordinary kettles now in general use, and which will at the same time be equipped with means for establishing and maintaining a constant steam pressure of considerable magnitude in that portion of the kettle which is above the surface of a liquid being boiled and beneath the lid of the kettle, but of insufficient magnitude to cause the lid of the kettle to be removed from its seat or to cause liquid to be forced out of the kettle spout by reason of excessive steam pressure.

With the above and other objects in view, I have devised a kettle provided with a steam conducting tube which extends within the kettle body from the mouth of the kettle to the upper portion of the spout thereof, and which is so constructed and arranged that there is at all times a fixed amount of steam pressure within the kettle and above the surface of a liquid being boiled, which fixed amount is insufficient to force the lid from its seat allowing steam to escape beneath the lid, or to allow the liquid to "boil over"; that is, to be forced out of the spout.

In the accompanying drawing forming a part of this specification,

Figure 1 is a sectional elevation of the kettle of the invention; and

Fig. 2 is a side elevation of a modified form of kettle equipped with the novel features of the invention.

Referring to both figures of the drawing, 10 denotes a kettle of ordinary configuration having a spout 11, a mouth 12, and a lid 13. The wall of the kettle body which is adjacent the spout, slants downwardly as denoted at 14, and the upper wall of the spout slants downwardly as denoted at 15, so that the upper portion of the spout joints the upper portion of the kettle at a point, designated 16, somewhat below the mouth of the kettle and the upper end of the spout.

The kettle just described is of ordinary construction. The steam conducting tube, which is for the purpose of establishing and maintaining a constant steam pressure above the surface of a liquid being boiled, is denoted by numeral 17. In Fig. 1 this tube is shown as extending from the mouth of the kettle, down the wall thereof, beneath point 16, and through the spout. The end of the tube which extends into the spout may terminate at the upper end of the spout or at any point therein at or above the level of the mouth of the kettle, and the end of the tube in the mouth of the kettle may terminate approximately at the mouth of the kettle, or may extend above the mouth, as denoted by numeral 18 in Fig. 2. In either case, the arrangement is such that the lid of the kettle has a firm seat on the kettle to completely close the mouth and confine the steam conducting tube, so that the only outlet for the steam is through said tube. The tube can be complete of itself and attached in any desired manner to the body of the kettle and spout, as is shown, or the walls of the kettle and spout, respectively, can form the upper wall of the tube, as will be understood.

It is to be noted that the tube is so arranged that it is impossible for the liquid being boiled to enter the tube to cause it to be obstructed. This is particularly so in the case of the tube of Fig. 2, which is shown extending upwardly a slight distance beyond the mouth of the kettle and into the space beneath the lid thereof.

The kettle shown and described is provided with a steam conducting tube of considerable length, which, while wholly confined within the structure of a kettle otherwise of ordinary configuration, is so constructed and arranged that a fixed and constant steam pressure will be established and maintained above the surface of a liquid being boiled and below the lid of the kettle. It will be obvious that the tube can be made any desired diameter so that any desired steam pressure can be established in the space above the liquid. In actual practice, the steam conducting tube will be of a size to maintain in the steam space of the kettle a considerable amount of steam pressure, but an insufficient amount to cause the lid to be lifted from its seat, or to cause the kettle to "boil over." It will be clear that the steam can escape only through the tube and spout and that there can be none of the rattling noises now caused by movements of the lid due to excessive steam pressure in the steam space of ordinary kettles.

It is essential that none of the liquid being boiled be allowed to get into the steam conducting tube in order that the tube may properly function to perform the service for which intended. It will be apparent that the liquid cannot get into either of the tubes shown in the drawing and hereinbefore fully described. Should steam become condensed in the tube at the end of a boiling operation, the resulting water would again become steam as soon as the next boiling operation got under way.

I am aware that kettles heretofore in use have been provided with tubes or pipes for removing steam from the steam space of the kettles, but I do not claim this idea broadly as my invention. The kettle invented by me and presently to be specifically claimed is capable of performing several useful functions hereinbefore fully set forth and not performed by kettles heretofore known, and my kettle is at the same time, so far as outward appearance goes, exactly the same as are common kettles now in general use in every household.

What I claim is:

1. A kettle having a mouth, a lid, a spout, and a steam conducting tube entirely within the kettle extending from the steam space beneath the lid downwardly through the body of the kettle and into the spout.

2. A kettle having a mouth, a lid, a spout, and a steam conducting tube entirely within the kettle extending from the steam space beneath the lid downwardly through the body of the kettle and into the spout through the lower end thereof.

3. A kettle having a mouth, a lid, a spout, and a steam conducting tube entirely within the kettle extending from the steam space beneath the lid downwardly through the body of the kettle and into the spout through the lower end thereof and terminating within the spout at a point at least level with the mouth of the kettle.

Signed at Bridgeport, in the county of Fairfield, and State of Connecticut, this 13 day of October, A. D. 1920.

HENRY M. HULL.